United States Patent Office 3,317,702
Patented May 2, 1967

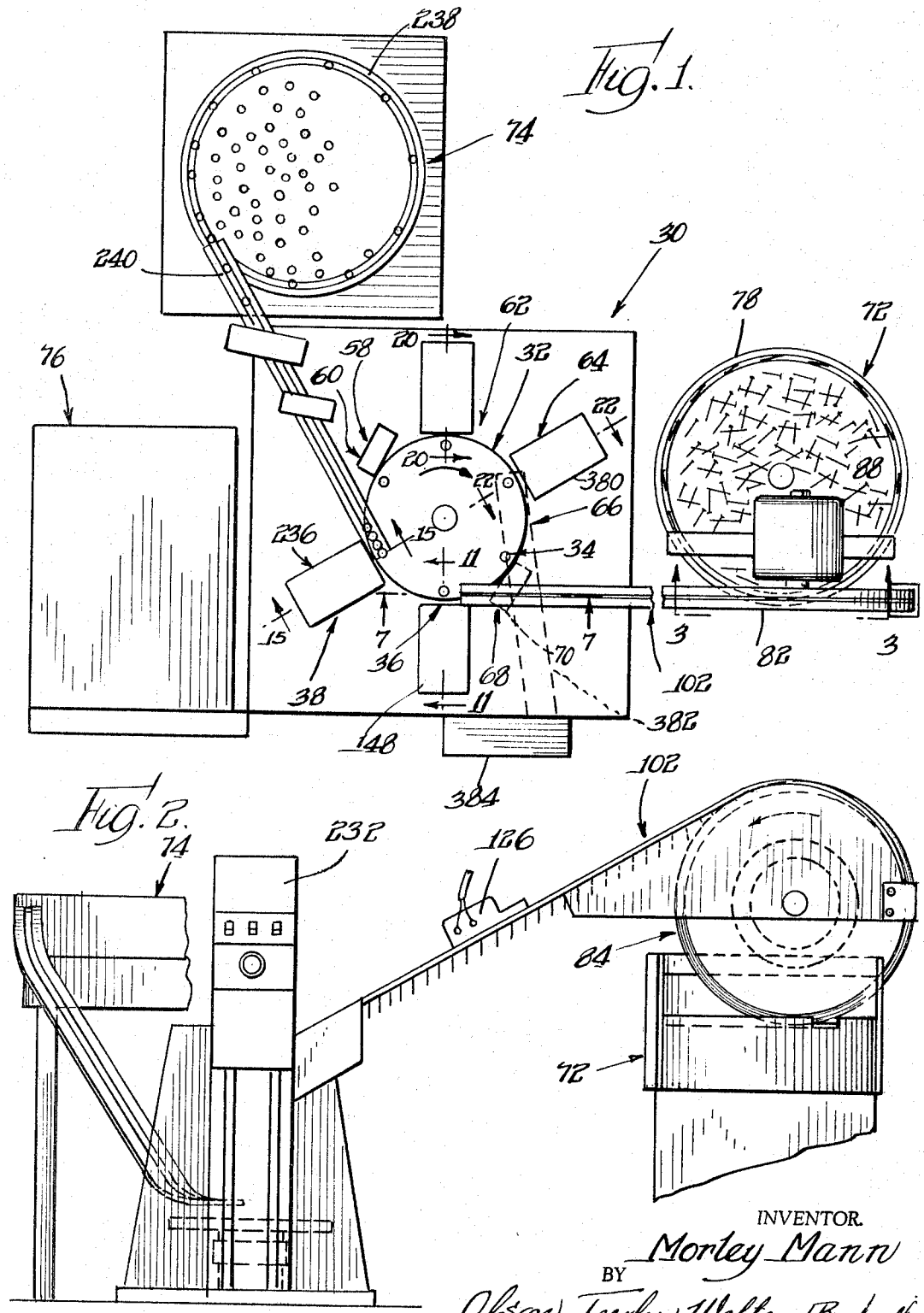

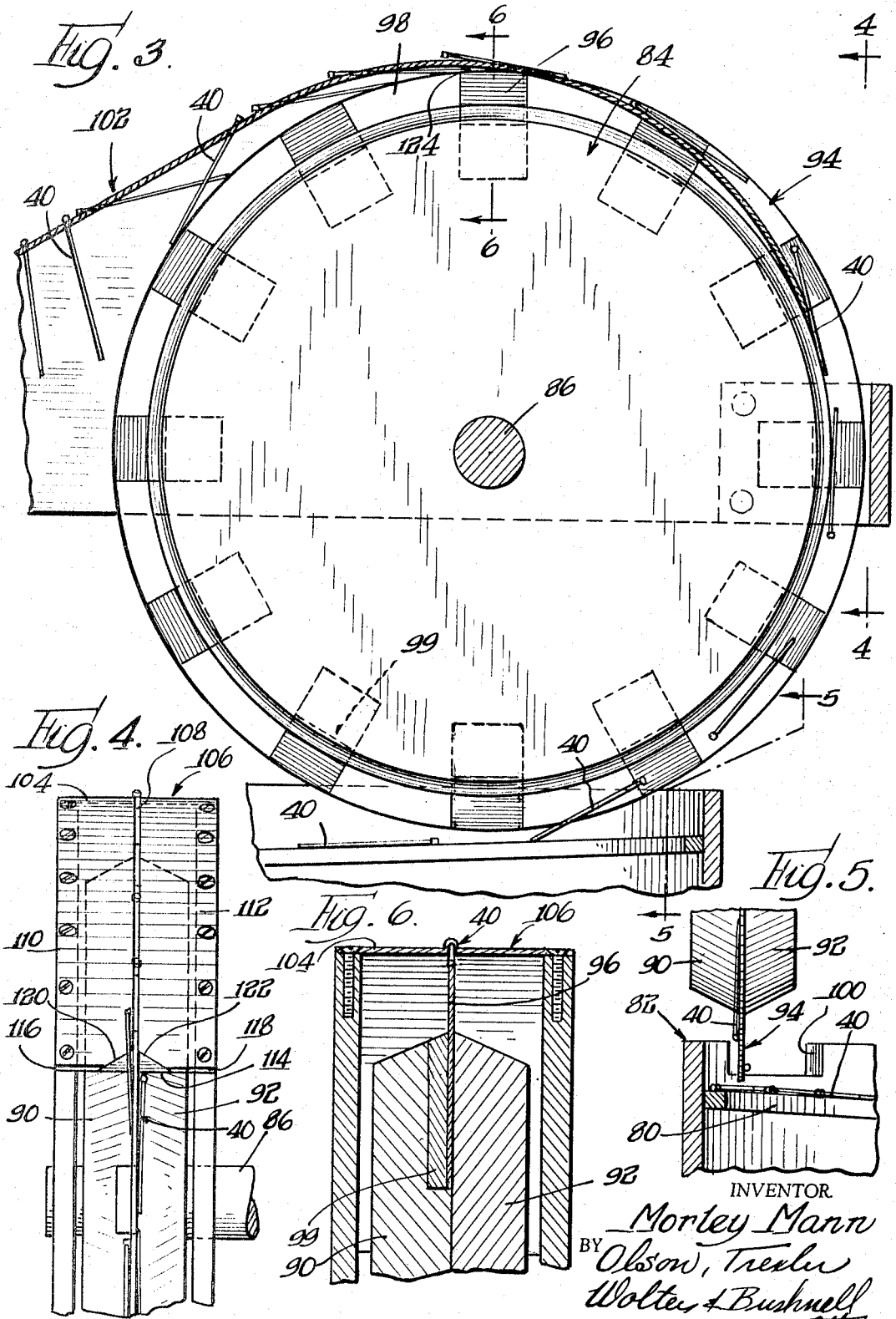

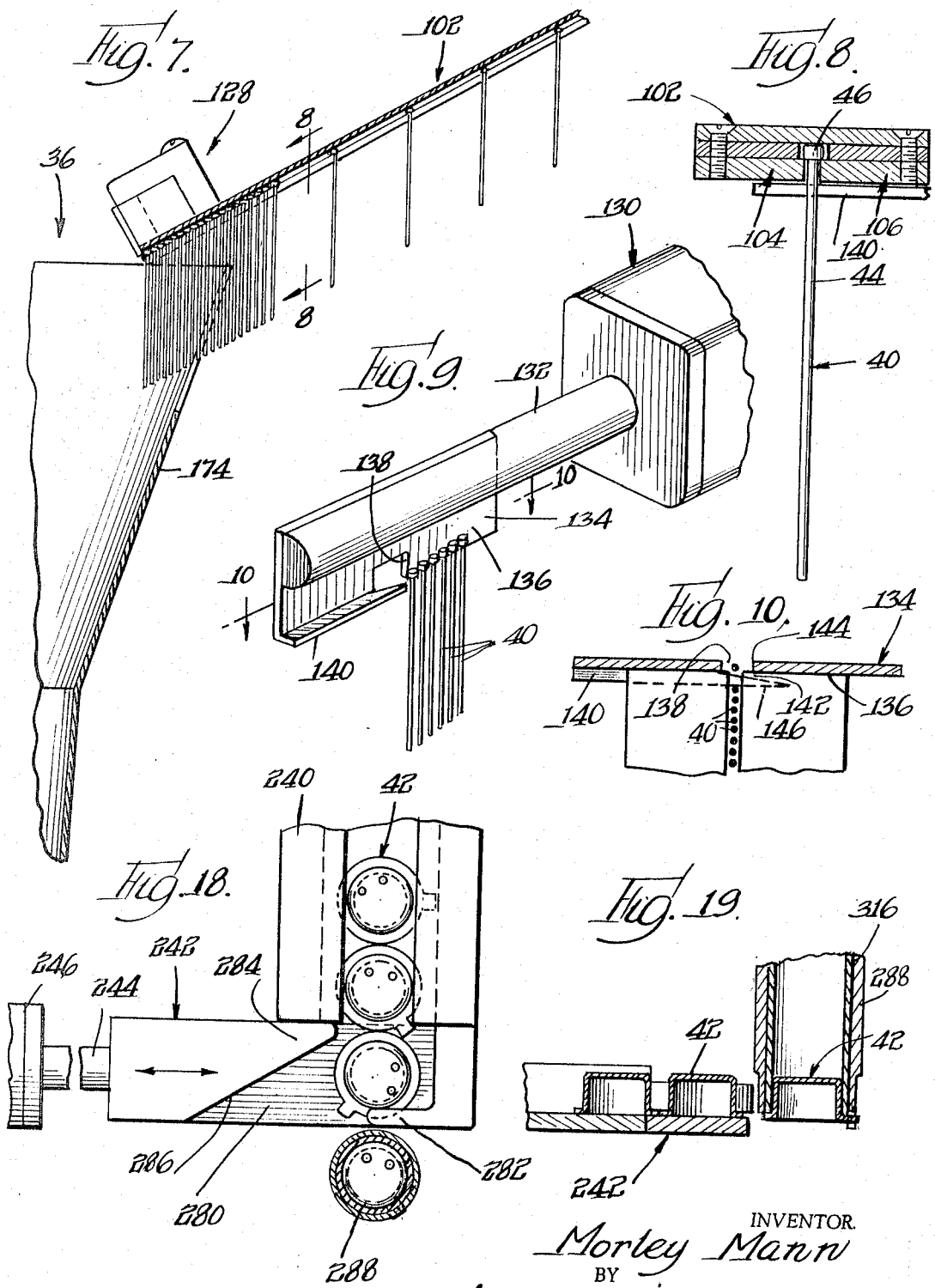

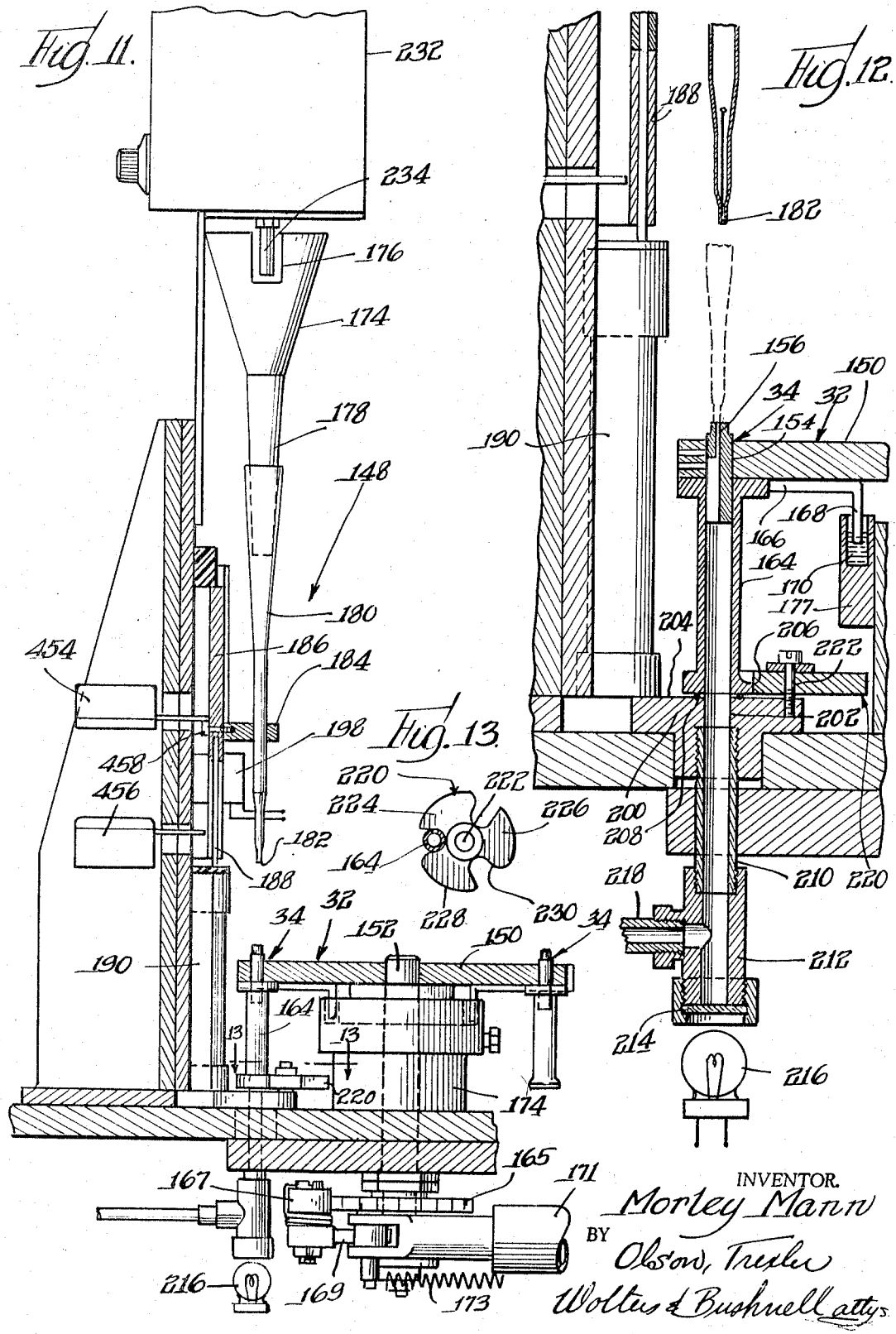

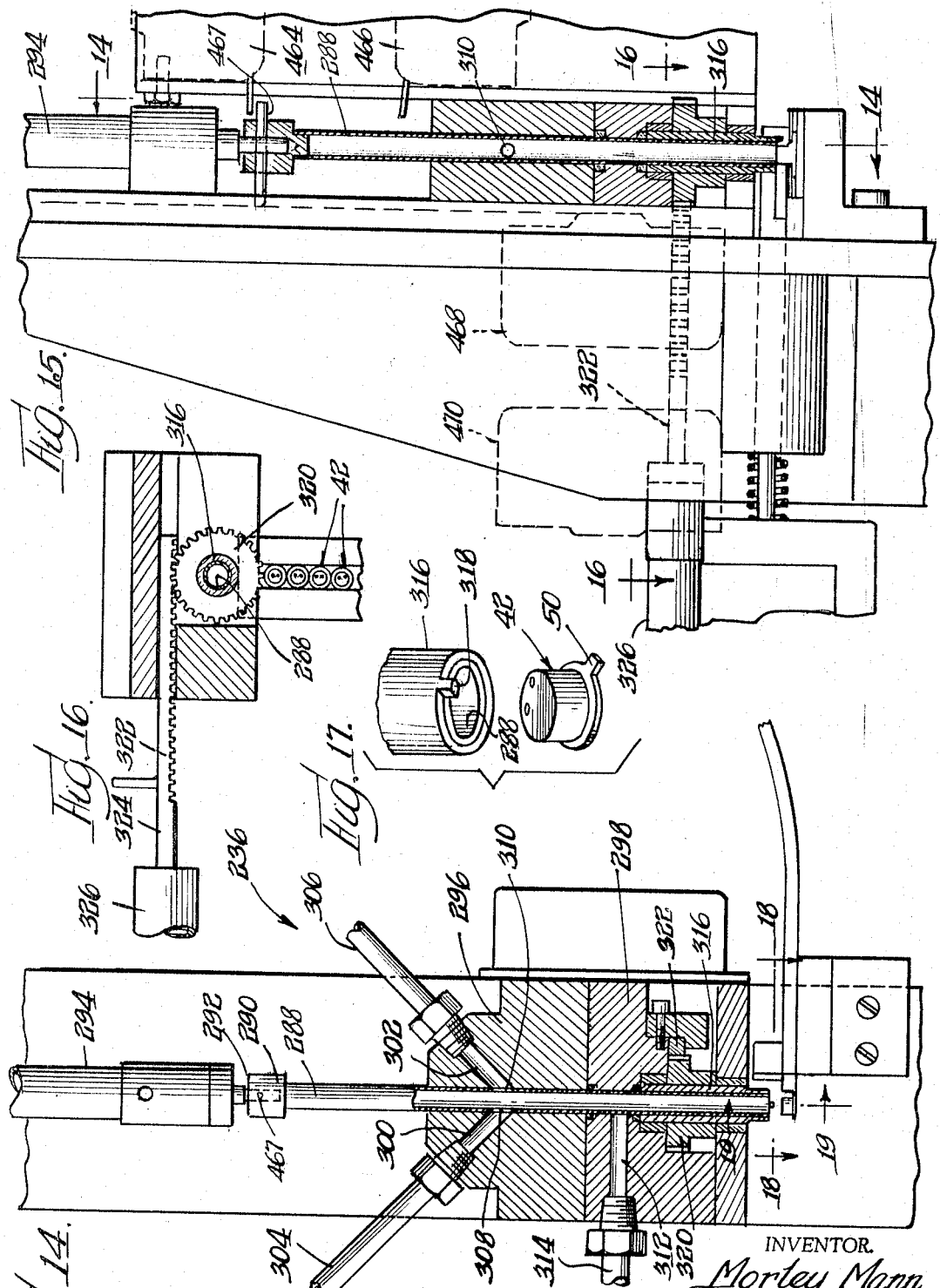

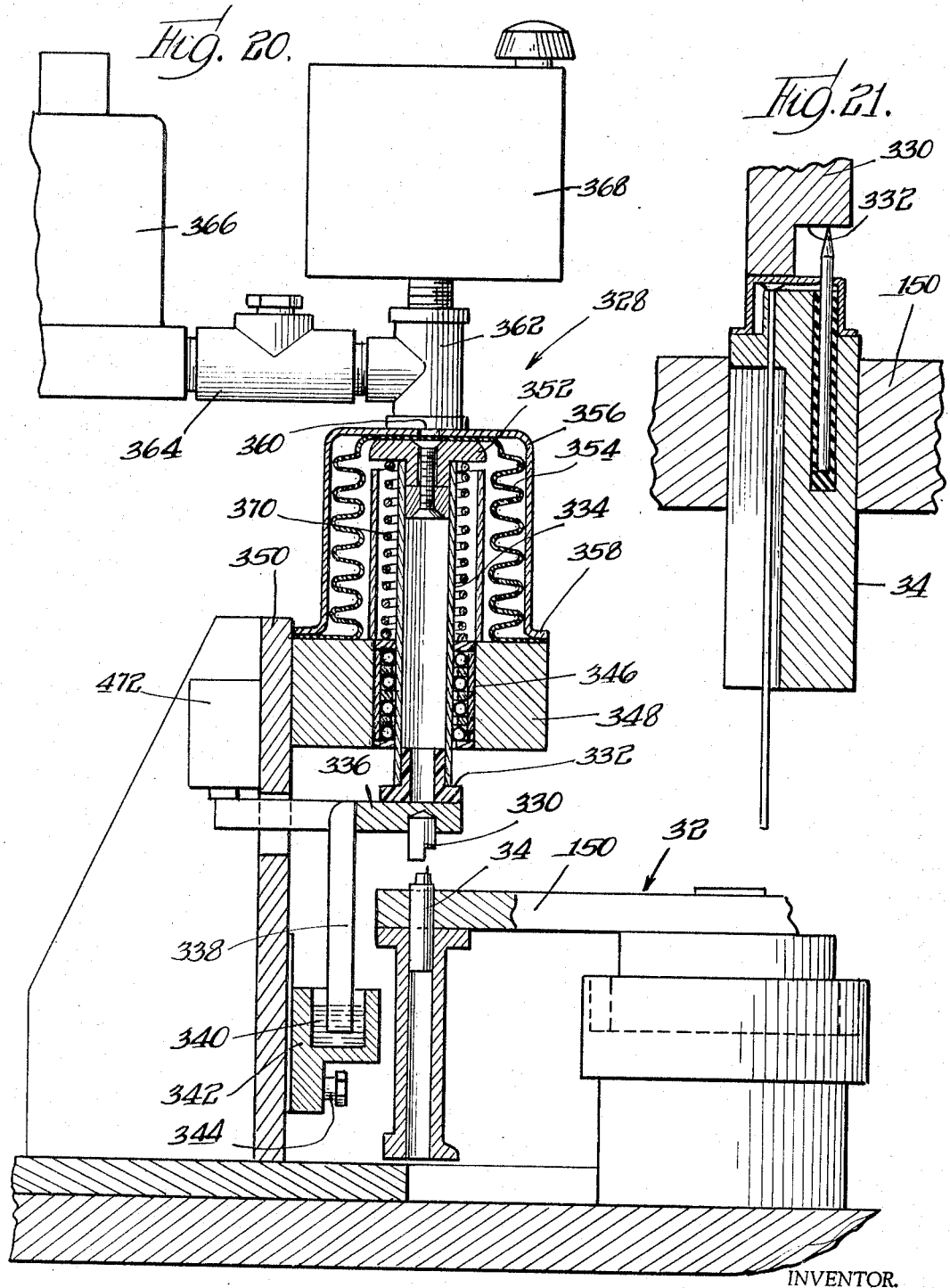

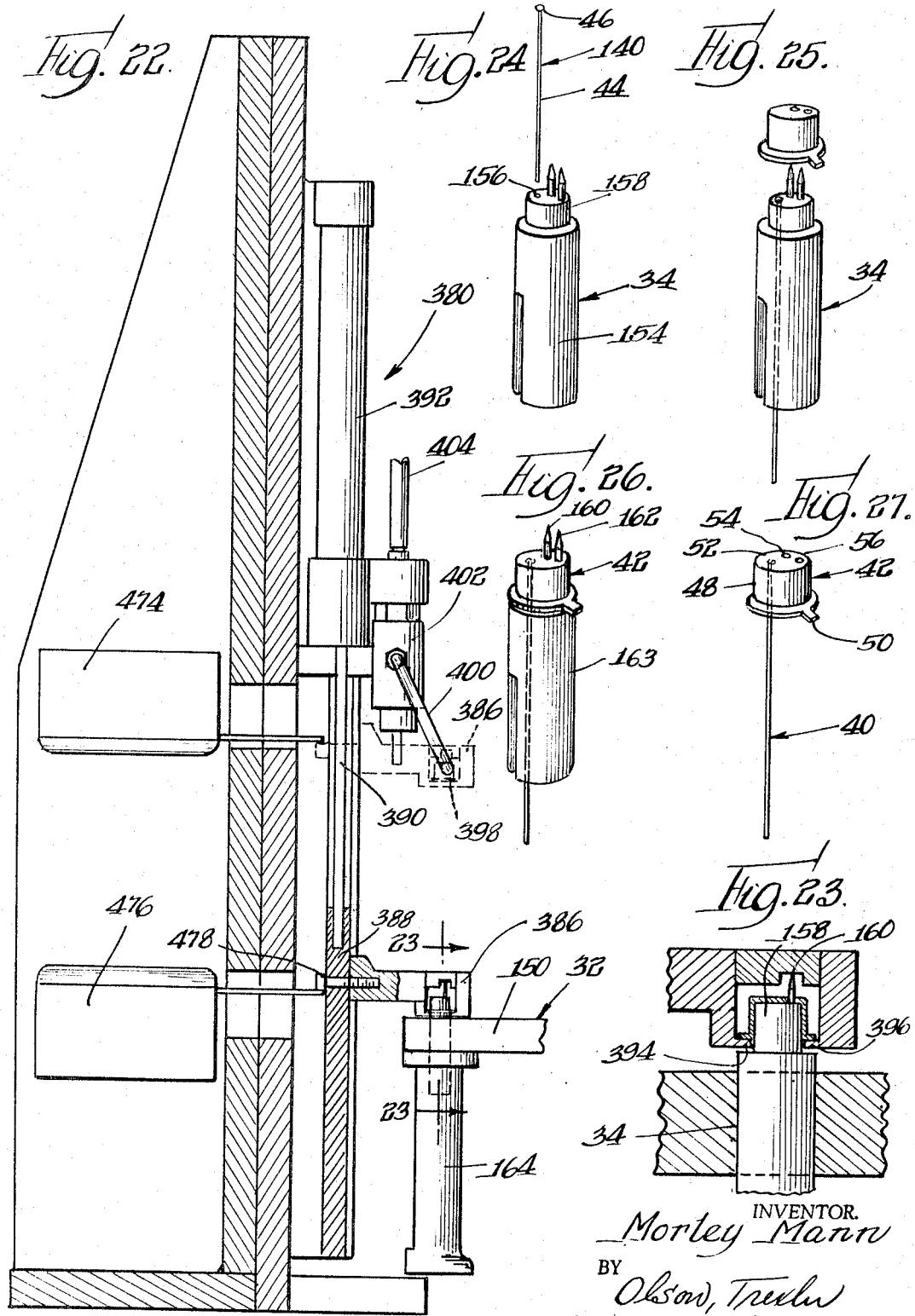

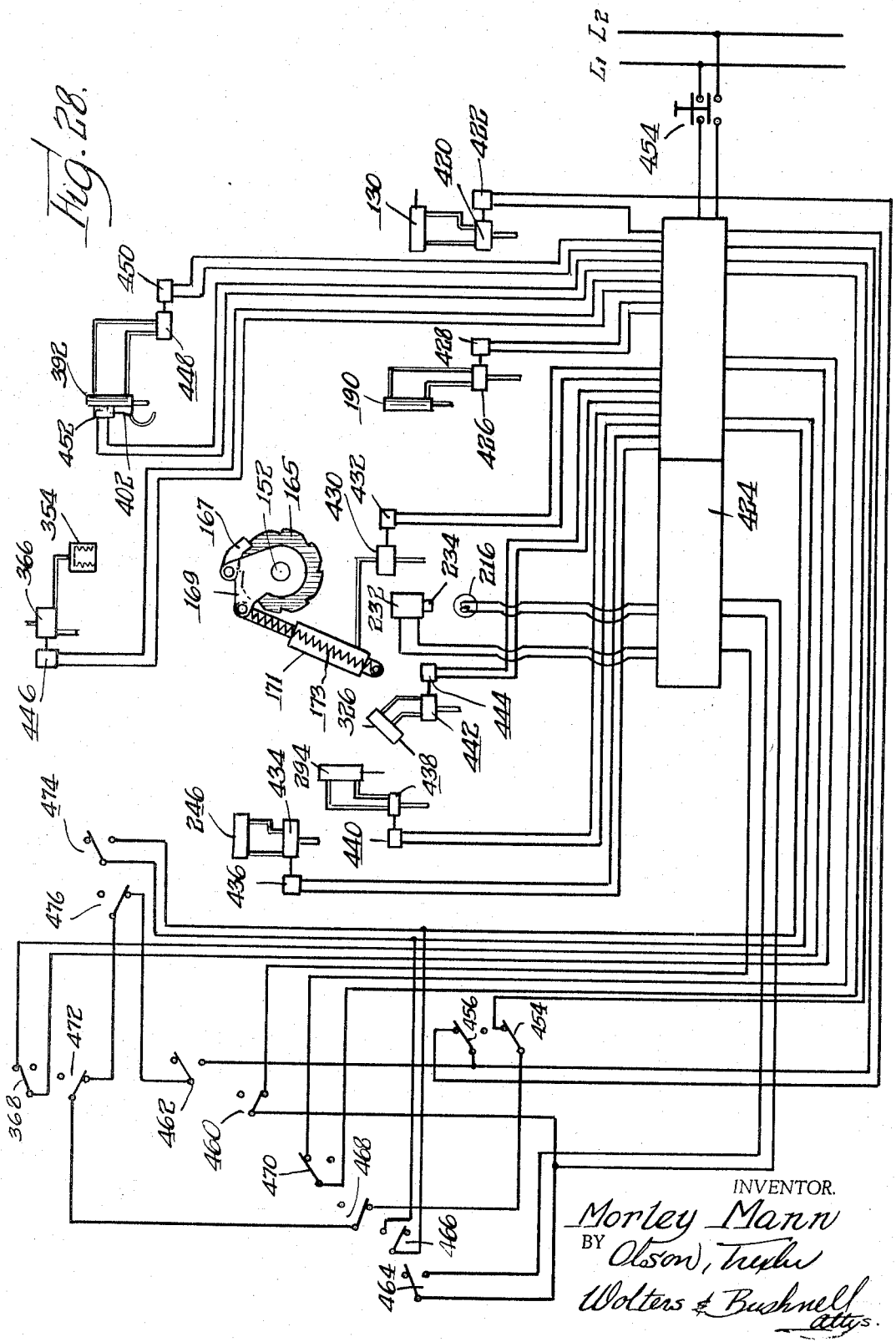

3,317,702
APPARATUS FOR ASSEMBLING WORKPIECES
Morley Mann, Elmhurst, Ill.
(739 Factory Road, Addison, Ill. 60101)
Filed June 17, 1963, Ser. No. 288,233
17 Claims. (Cl. 219—79)

The present invention relates to a novel apparatus for assembling and securing together a plurality of workpieces, and more specifically to a novel apparatus particularly suitable for assembling and welding together relatively small workpieces.

While various types of workpieces may be processed with apparatus incorporating features of the present invention, the embodiment of the apparatus disclosed herein for the purpose of illustrating the invention is especially suitable for assembling workpieces such as thin wire leads having an enlargement or head thereon with caps or sheet metal bodies for transistors and the like. Such workpieces are frequently quite small and are subject to bending or other injury so that substantial difficulties are encountered when attempting to handle and assemble the workpieces efficiently and without injury thereto. Furthermore, it is frequently necessary to assemble the workpieces not only securely but also with accuracy in order to obtain a satisfactory part while at the same time accomplishing the assembly at an economical rate.

It is an important object of the present invention to provide a novel apparatus for assembling wire leads or similar parts having an enlargement or head thereon with another workpiece such as a transistor body or cap in a manner which enables the assembly to be accomplished accurately, securely and at high speed.

A further important object of the present invention is to provide a novel apparatus of the above described type which is capable of separating small wire-like workpieces from a mass of such workpieces and of feeding and accurately positioning the separated workpieces with respect to a complementary part.

A further object of the present invention is to provide a novel apparatus of the above described type which is constructed for rapidly, efficiently and automatically feeding and orienting successive workpieces such as caps or bodies of transistors or the like for enabling complementary workpieces such as wire leads to be accurately positioned with respect thereto.

Still another important object of the present invention is to provide a novel apparatus of the above described type which is constructed for enabling workpieces assembled together and positioned in abutting relationship to be securely welded to each other at high speeds.

A more specific object of the present invention is to provide electric welding means constructed for effecting a welding operation at high speeds and for movement into engagement with and out of engagement from a workpiece at high speeds whereby to promote more efficient and economical assembly of the workpieces.

Still another important object of the present invention is to provide a novel apparatus of the above described type which is capable of feeding, positioning, welding and discharging successive workpieces automatically and reliably.

Other objects and advantages of the present invention will become apparent from the following description and the accompanying drawings wherein:

FIG. 1 is a simplified plan view showing an apparatus incorporating features of the present invention;

FIG. 2 is a simplified front elevational view of the apparatus shown in FIG. 1;

FIG. 3 is an enlarged partial sectional view taken generally along line 3—3 in FIG. 1;

FIG. 4 is a fragmentary view taken generally along line 4—4 in FIG. 3;

FIG. 5 is a fragmentary view taken generally along line 5—5 in FIG. 3;

FIG. 6 is a fragmentary sectional veiw taken generally along line 6—6 in FIG. 3;

FIG. 7 is an enlarged fragmentary sectional view taken generally along line 7—7 in FIG. 1;

FIG. 8 is an enlarged sectional view taken generally along line 8—8 in FIG. 7;

FIG. 9 is a fragmentary perspective view showing a portion of the mechanism for feeding successive lead elements or other workpieces;

FIG. 10 is a fragmentary sectional view taken along line 10—10 in FIG. 9;

FIG. 11 is an enlarged partial sectional view taken generally along line 11—11 in FIG. 1;

FIG. 12 is a further enlarged sectional view similar to FIG. 11 but showing certain features of the construction in greater detail;

FIG. 13 is a fragmentary view taken along line 13—13 in FIG. 11;

FIG. 14 is a partial sectional view taken generally along line 14—14 in FIG. 15;

FIG. 15 is an enlarged partial sectional view taken generally along line 15—15 in FIG. 1;

FIG. 16 is a partial sectional view taken along line 16—16 in FIG. 15;

FIG. 17 is an exploded fragmentary perspective view showing a workpiece such as a transistor body or cap and an element of the apparatus engageable with the workpiece for positioning and orienting the workpiece in a predetermined manner;

FIG. 18 is an enlarged fragmentary view taken generally along line 18—18 in FIG. 14;

FIG. 19 is an enlarged fragmentary partial sectional view taken generally along line 19—19 in FIG. 14;

FIG. 20 is an enlarged partial sectional view taken generally along line 20—20 in FIG. 1;

FIG. 21 is a further enlarged fragmentary sectional view showing the welding device of FIG. 20 in engagement with assembled workpieces during a welding operation;

FIG. 22 is an enlarged partial sectional view taken generally along line 22—22 in FIG. 1;

FIG. 23 is an enlarged fragmentary sectional view taken generally along line 23—23 in FIG. 22;

FIG. 24 is a perspective view showing a workpiece or headed wire lead in position to be assembled with an electrode fixture in accordance with the present invention;

FIG. 25 is a perspective view showing a workpiece or metal cap or body element in position to be assembled over the electrode fixture and a previously positioned lead;

FIG. 26 is a perspective view showing the lead and cap or body member assembled with the electrode fixture and in condition to be welded together;

FIG. 27 is a perspective view showing a finished lead and cap or body member assembly; and FIG. 28 is a schematic view showing a control circuit incorporated in the apparatus of the present invention.

Referring now more specifically to the drawings wherein like parts are designated by the same numerals throughout the various figures, an apparatus 30 incorporating features of the present invention is shown in simplified form in FIGS. 1 and 2. In general the apparatus comprises a turret 32 having a plurality of workpiece accommodating electrode fixtures 34 equally spaced therearound, which electrode fixtures will be described more in detail below. The turret is adapted to be indexed intermittently for advancing successive workpiece-receiving fixtures 34 to a first loading station 36 and then to a second loading station 38.

The mechanism at the first loading station 36 is adapted to feed workpieces such as wire electrodes 40 to the fixture 34 while the mechanism at the station 38 is adapted to feed workpieces 42 to the fixture. The workpieces 40 and 42 are shown best in FIGS. 8, 18 and 23–27. The workpieces 40 respectively include an elongated thin wire shank or body 44 and an enlargement or head 46 at an end thereof. The workpieces 42 have a cap-shaped body 48 and a tab 50 extending laterally from a free margin of the body. In addition the body has a substantially closed end 52 formed with a plurality of small apertures 54 and 56. It will, of course, be appreciated that the details of construction of these workpieces form no part of the present invention and may be varied as desired.

The turret 32 is adapted to advance the loaded workpieces and electrode fixture from the loading station 38 past a station 58 at which a microswitch 60 is located for checking proper loading and position of the workpieces. Spaced from the checking station 58 is a work station 62 at which the workpieces positioned on the electrode fixtures 34 are welded together. The turret then conveys the welded workpieces to an unloading station 64 at which the assembled and finished parts are discharged in the manner which will be described. From the unloading station the successive fixtures pass an idle station 66 which may be used for servicing or replacing the fixtures when desired. After the idle station, the fixtures pass another checking station 68 at which a microswitch 70 is located for insuring that the successive fixtures are properly unloaded before they are again advanced to the loading station.

As shown in FIGS. 1 and 2, the apparatus 30 also includes a mechanism 72 for containing a supply of the workpieces or lead wires 40 and feeding the workpieces to the loading station. Another mechanism 74 is included for containing a supply of the workpieces 42 and feeding these workpieces to the loading station 38. In addition a power and welding unit 76 which may be of known construction is connected with a welding device at the work station 62.

As shown in FIGS. 1–3 and 5, the mechanism 72 comprises a hopper 78 which is adapted to contain a mass of the workpieces 40. An annular spiral track 80 is provided along the inner wall of the hopper 78 and means is provided in the hopper for vibrating the hopper in a known manner for causing the workpieces 40 to advance along the track 80 to a predetermined peripheral portion 82.

A wheel 84 is mounted on a rotatable axle 86 above the peripheral portion 82 of the hopper 78 and is continuously driven by any suitable means such as a motor drive unit 88. The wheel comprises opposite body members 90 and 92 which support a thin radially extending annular flange means 94 therebetween. The flange means comprises a plurality of circumferentially spaced and radially extending magnetic sections 96 separated by nonmagnetic sections 98. Permanent magnets 99 are disposed within the wheel in engagement with the magnetic elements 96 as shown in FIGS. 3 and 6. As shown best in FIGS. 4 and 5, the flange means extends through a slot 100 in the peripheral portion 82 of the hopper to a position closely above the track 80.

Upon rotation of the wheel 84, the successive magnetic flange portions 96 pick up successive workpieces 40 from the track 80 in the hopper. It will be observed that the magnetic flange portions 96 are circumferentially spaced apart a distance at least substantially as great as the length of the workpieces 40 so that each workpiece will be magnetically retained by only one of the magnetic elements 96. The flange means of the wheel 84 is also spaced sufficiently inwardly from the inner surface of the hopper so that the workpieces 40 may be picked up on both sides of the magnetic elements 96 and may be picked up either at the headed end thereof or the opposite end or an intermediate portion.

A track or guide structure 102 extends from the wheel 84 downwardly to the loading station 36 as shown in FIGS. 1–4 and FIGS. 6–8. The track structure includes a pair of guide members 104 and 106 which are disposed so as to define a narrow slot 108 therebetween. The slot has a width slightly greater than the thickness of the wheel flange means 94 and also slightly greater than the diameter of the shank or body portion 44 of the workpieces 40 but less than the diameter of the enlargement or head portion 46 of the workpieces. As shown best in FIGS. 3 and 4 upper end portions 110 and 112 of the track members extend over the uppermost edge of the wheel flange and then spiral downwardly on opposite sides of the wheel flange to a point 114 which is preferably located above a horizontal plane containing the axis of the wheel. Furthermore the upper end portions of the track members spiral inwardly so that their terminal ends 116 and 118 substantially abut the wheel members 90 and 92. The terminal ends of the track members are ground down at 120 and 122 for providing knife edges 116 to 118 at the end of the slot 108 overlapping the beveled edges of the wheel members 90 and 92.

When the wheel 84 is rotated, workpieces 40 are picked up by the successive magnetic elements 96 as shown best in FIGS. 3, 4 and 5 and are carried upwardly out of the hopper. It will be observed that the workpieces may be located at either side of the magnetic elements 96 and that some of the workpieces will be positioned with their head portions 46 facing forwardly of the direction of rotation of the wheel while other of the workpieces will be disposed with their head portions facing rearwardly of the direction of rotation. As the workpieces 40 are carried upwardly around the periphery of the wheel, they are advanced over the edges 116 and 118 of the track members at the position 114.

Continued rotation of the wheel causes the workpieces to slide along the outer surfaces of the track members which track members progressively force the workpieces radially outwardly along the side surfaces of the magnetic elements. When the workpieces have been advanced to the uppermost position of the wheel indicated by the numeral 124 in FIG. 3, they are carried by the track members radially outwardly of the side surfaces of the magnetic elements 96 but at the same time the workpieces are magnetically retained by the elements. As a result the workpieces are shifted from the side surfaces of the magnetic elements to the peripheral ends or edges thereof and into alignment with the slot 108. Then upon continued rotation of the wheel the workpieces are magnetically pushed onto and along the downwardly sloping portions of the track members. At this time the enlargements or head portions 46 of the workpieces are retained by the track members while the reduced diameter shank portions are retained by the magnetic elements and are drawn back through the slot 108 as indicated at the upper lefthand portion of FIG. 3. Finally upon continued advancement of the workpieces downwardly along the track members the lower ends of the workpieces fall free from the magnetic elements on the wheels. Thus the workpieces are properly oriented for subsequent loading at the station 36.

After the workpieces 40 are free from the magnetic elements of the wheel 84, they slide by gravity down the track members to the loading station 36. If desired, a vibrator 126 may be provided on the track structure 102 for preventing the workpieces from sticking and for promoting free movement down the track members.

A device 128 shown in FIGS. 7–10 is provided at the lower end of the track structure 102 for discharging the workpieces 40 one at a time from the track structure. The device 128 comprises a pneumatic cylinder 130 and complementary piston presenting a reciprocable piston rod 132 carrying a gate member 134. The gate member 134 traverses the lower end of the track structure and presents a wall portion 136 normally closing the lower end of the track. A slot 138 is provided in the wall 136 for permitting a workpiece 40 to fall from the track when the gate member is shifted by the air cylinder for aligning the slot 138 of the gate member with the slot 108 of the track structure.

In order to insure the release of only a single workpiece 40 at one time, the gate member 134 includes a flange portion 140 projecting from a lower edge of the wall element 136 at a position beneath the ends of the track members 104 and 106. The flange 140 includes a beveled finger-like end portion 142 which traverses the slot 138 and combines with an opposite edge 144 of the slot to define a gate opening 146 which faces in a direction extending transversely of the track structure. Thus in order to discharge a workpiece 40 from the track structure, the air cylinder is actuated for shifting the gate member toward the right as viewed in FIGS. 9 and 10 for causing the finger element 142 to be advanced between the reduced diameter shank portions 44 of adjacent workpieces. This relative movement of the gate member causes the lowermost workpiece to pass through the gate opening 146 and then through the slot 138. The enlarged head portions 46 of the adjacent workpieces cause the reduced diameter shank portions to be slightly spaced with respect to each other for facilitating the entry of the finger element therebetween. Of course since the finger element 142 projects between the workpieces, the upper workpieces are retained in the track while the lowermost workpiece is discharged. Upon return movement of the gate member toward the left, the finger element 142 is withdrawn and the next workpiece advance against the stop surface provided by the wall 136.

The apparatus includes a mechanism 148 shown in FIGS. 11-13 at the loading station 36 for receiving workpieces from the track 102 and feeding the workpieces 40 to the fixtures 34 on the turret 32. The turret 32 comprises a disc 150 mounted on a shaft 152 for rotation about a vertical axis. As previously indicated, a plurality of electrode fixtures 34 are spaced around the disc 150. Each of the fixtures 34 includes a cylindrical body 154 mounted in an aperture extending through the disc 150. A small aperture 156 extends entirely through the body 154, which aperture 156 has a diameter slightly greater than the diameter of the shank portion 44 of a workpiece 40 but less than the diameter of the head portion 46 of the workpiece. The mechanism 148 is adapted to insert the shank portion 44 of the workpiece into the aperture 156 in the manner described below.

Each of the fixtures 34 includes an upper end portion 158 which, as shown best in FIGS. 23-26 is adapted to receive and support an inverted cup-shaped workpiece 42. The diameter of the upper end portion 158 of the fixture is similar to but slightly less than the internal diameter of the cup-shaped workpiece 42 for firmly and accurately supporting the workpiece. As previously indicated, the workpiece 42 is formed with apertures 54 and 56 through the closed end thereof, and the fixture 34 includes pins 160 and 162 embedded in insulating means 163 extending from the upper end thereof for projecting through the apertures 54 and 56 and thereby fixing the workpiece in a predetermined position and against rotation on the fixture. Of course, these pins also fix the workpiece 42 with respect to the aperture 156 in the fixture and thus a lead or workpiece 40 so that the lead will be secured to the cap member at an accurately determined point.

The turret 32 includes a plurality of tubular members 164 secured to the underside thereof and aligned with and telescoping over the lower ends of the fixture 38. These tubes provide conduits adapted to be connected with a suction of vacuum conduit in the manner discussed more fully below for insuring proper entry of the leads or workpieces 40 into the apertures 156 in the fixtures.

As previously indicated, the fixtures 34 not only serve to support the workpieces but also provide electrodes for the welding operation. The fixtures 34 are respectively connected with a source of electrical power through electrical conductors 166 carried beneath the turret disc 150 and having inner end portions 168 bending downwardly and projecting into an annular trough 170 formed in an annular member 172 surrounding a bearing housing 174 which rotatably supports the turret shaft 152. The trough 170 is filled with a suitable electricity-conducting liquid such as mercury and is also suitably electrically connected with the welding power and control unit 76.

In order to index the turret, a ratchet wheel 165 is fixed to the turret shaft for actuation by an oscillating pawl 167 as shown in FIGS. 11 and 28. The pawl is carried by a lever 169 which is actuated in one direction by an air cylinder 171 and returned by a spring 173.

As shown in FIG. 11, the feeding mechanism 148 comprises a first funnel-shaped member 174 disposed above and in vertical alignment with a fixture 34 at the loading station. A slot 176 is provided in an upper margin of the funnel 174, through which slot the workpieces 40 are introduced by the track structure 102. A reduced diameter lower end portion 178 of the funnel 174 telescopes within an upper end portion of a second and smaller diameter funnel member 180, which funnel member 180 has a progressively reduced diameter so that its lower end presents a bottom opening 182 having a diameter slightly larger than the maximum diameter of a workpiece being processed, or in other words, slightly larger than the diameter of the head portions of the wire leads. The funnel member 180 is fixed to and supported by a bracket 184 which in turn is carried by a vertically reciprocable slide member 186. The slide member 186 is connected to and actuated by a piston rod 188 extending from a double acting air cylinder 190.

The air cylinder 190 is operable for shifting the funnel 180 between the raised position shown in solid lines in FIGS. 11 and 12 and the lowered position shown in broken lines in FIG. 12. In the raised position, the lower end of the funnel 180 is located above the turret a distance at least as great as the length of the wire leads or workpieces 40. This facilitates clearing of the lower end of the funnel in the event a workpiece becomes bent or otherwise jammed. When the funnel member 180 is in the lowered position, the discharge opening 182 thereof substantially abuts an upper end of a fixture 34 and is in alignment with the aperture 156 of the fixture so as to promote proper entry of a wire lead or workpiece into the fixture aperture. Preferably a vibrator 198 is provided on the mechanism 148 for agitating the funnel member 180 and thereby promoting advancement of the very small lightweight wire workpieces down through the funnel member.

In order to insure proper entry of a workpiece into the fixture aperture 156 and also to increase the speed of such entry, a vacuum is applied to the lower end of the fixture so that the workpiece is sucked into the aperture by air pressure as well as by gravity. As previously indicated, the tube 164 associated with each fixture 34 on the turret is adapted to be connected with a source of vacuum when the fixture is located at the loading station. As shown in FIGS. 11 and 12, a fitting 200 is mounted in alignment with the loading station, which fitting has an aperture 202 therethrough and an upper surface 204 located slightly below the lower surface 206 of the tube 164. An O-ring 208 or other sealing element is suitably mounted on the surface 204 for substantially sealing the junction between the tube 164 and the fitting 200 when the tube is at the loading station.

A conduit 210 is connected with and extends vertically downwardly from the fitting 200 to a T-shaped fitting 212. A lower end of the T-shaped fitting 212 is closed by a glass or other transparent closure 214 which, it will be observed, is in vertical alignment with the aperture 156 through a fixture 34 and the funnels 174 and 180. An electric bulb 216 or other source of light is provided beneath the lower end of the fitting 212 for a purpose described below. A conduit 218 is connected with a laterally extending opening of the T-fitting 212, which conduit is adapted to be connected with any suitable source of reduced pressure or vacuum, not shown.

A rotary valve element 220 shown in FIGS. 11, 12, and 13 is provided for closing and substantially sealing the port 202 during an indexing movement of the turret 32. More specifically, the valve element 220 is rotatably supported by a shaft providing a screw 222 in a position so that segments 224, 226 and 288 may be successively advanced into position for overlying and closing the port 202. Slots 230 are provided between the aforementioned segments of the valve element 220 for receiving the tube members 164 of the turret. The arrangement is such that during an indexing movement of the turret, a tube member 164 at the loading station is disposed within one of the slots 230 and serves to drive and rotate the valve element. Thus as the tube member 164 leaves the port 202, one of the radially extending segments of the valve element is advanced to cover the port. Upon continued rotation of the turret, a following tube member 164 enters the next slot 230 and it continues to rotate the valve until the turret stops with the tube member in alignment with the port 202. This action is, of course, repeated upon each indexing movement of the turret.

In order to control operation of the apparatus in a manner more fully described below a unit 232 is mounted above the feeding funnels, which unit has a photo-electric cell or light sensitive element 234 in axial alignment with the discharge opening 182 at the bottom of the lowermost funnel member 180, the aperture 156 through the fixture 34 and the light source 216. The arrangement is such that when a fixture is properly aligned with the funnel members and the aperture 156 is clear a beam of light from the source 216 will contact the light sensitive element 234 so that the control circuit means described more in detail below is in one condition and when a lead wire enters the aperture 156 and breaks the light beam, the circuit is energized for operating the funnel-reciprocating cylinder 190 and continuing the operation of the apparatus.

The apparatus 30 is provided with a mechanism 236 at the loading station 38, which mechanism is shown in FIGS. 14–19 and is adapted to receive successive cap or body members 42 or other corresponding workpieces and then position such workpieces in a predetermined manner and apply the workpieces to a fixture 34 located at the loading station 38. The mechanism 236 is adapted to receive the workpieces 42 from the supply and feeding unit 74, which supply and feeding unit may be of known construction and therefore need not be described in detail. It suffices to state that the unit 74 includes a hopper 238 for containing a supply of the workpieces 42 from which the workpieces are delivered to a track 240 along which the workpieces slide downwardly to the mechanism 238.

As shown best in FIG. 18, the lower end of the track 240 is normally closed by a gate member 242 carried by and reciprocable with a piston rod 244 which in turn is actuated by an air cylinder 246. The gate member 242 is formed with an upwardly facing surface portion 280 which provides a continuation of the workpiece supporting surfaces of the track structure 240 so that successive workpieces 42 slide from the track member onto the surface 280. An element 282 of the gate member partially traverses the surface 280 along a margin thereof opposite from the end of the track 240 while another beveled finger portion 284 of the gate member is offset laterally from the element 282 and extends to a position along the margin of the surface 280 immediately adjacent the end of the track 240. Thus the end of the element 282 and the outwardly facing beveled or cam surface 286 of the finger element 284 define a lateral opening through which workpieces 42 may pass when the gate member 242 is shifted toward the right as viewed in FIG. 18. During such shifting movement the finger 284 retains following workpieces 42 on the track structure 240 while the cam surface 286 engages the workpiece 42 on the surface 280 and causes the workpiece to be shifted laterally off of the surface 280. In this connection it is to be noted that inertia prevents the workpiece 42 from moving toward the right with the gate member 242. Of course, when the gate member is retracted the finger element 284 is withdrawn to permit the next workpiece 42 to advance from the track structure 240 onto the surface 280 and against the retaining element 282.

As shown in FIGS. 14 and 15, the mechanism 236 for feeding and positioning the workpieces 42 comprises a tube 288 having its upper end closed by a fitting 290 and connected with a piston rod 292 which is reciprocable by a double-acting air cylinder 294. The tube 288 is axially aligned with a fixture 34 on the turret at the loading station 38 and is adapted to be reciprocated by the air cylinder 294 from the raised position with the lower end thereof adjacent and slightly above the gate member 242 to a lower position in association with a fixture 34 at the loading station 38.

The tube 288 slidably extends through valve blocks 296 and 298. The block 296 is formed with passageways 300 and 302 which are connectable by conduits 304 and 306 with a suitable source of vacuum, not shown. The tube 288 is provided with ports 308 and 310 in opposite sides thereof, which ports are respectively adapted to communicate with the passageways 300 and 302 when the tube is in the raised position shown in FIGS. 14 and 15. In other words, when the tube is in the raised position it is connected with a suitable source of vacuum so that a suction is created at the lower end of the tube. This suction is effective for drawing a workpiece 42 up against the lower end of the tube 288 when the workpiece is discharged laterally from the gate member 242 and into substantial axial alignment with the tube.

The valve block 298 is provided with a passageway 312 which is connectable by a conduit 314 with a suitable source of air under pressure. The passageway 312 is spaced beneath the passageways 300 and 302 a distance substantially equal to the length of the downward movement of the tube 288. The arrangement is such that after a workpiece 42 is picked up and retained in association with the lower end of the tube 288 by the aforementioned suction, the tube 288 is actuated downwardly by the cylinder 294 for applying the workpiece 42 over the upper end of a fixture at the loading station 38. When the tube 288 substantially reaches its lowermost position, the port 308 communicates with the passageway 312 and is, of course, disconnected along with the port 310 from the vacuum passageways. When communication is established with the pressure passageway 312 the vacuum within the tube 288 is broken and the air under pressure serves to provide a positive force for discharging the workpiece 42 from the lower end of the tube and onto the fixture.

Before the tube 288 is lowered for applying a workpiece to a fixture, it is necessary to assure that the workpiece is properly oriented so that the previously described apertures 54 and 56 therein are in alignment with the upwardly extending pins 160 and 162 on the fixture. The mechanism 236 includes means for turning the workpiece 42 in order to insure proper orientation thereof. This means includes a sleeve 316 rotatably surrounding the tube 288 and having a finger element 318 depending beneath the lower end of the tube for inter-engagement with the previously described laterally extending tab 50 on a workpiece 42. The sleeve 316 is connected to and rotatable with a gear 320 which meshes with a reciprocable rack 322. The rack 322 is connected with and operable by a piston rod 324 associated with a double acting air cylinder 326. The construction is such that each time a workpiece 42 is picked up by the lower end of the tube 288, the rack is actuated for rotating the gear 320 and thus the sleeve 316 a predetermined amount slightly less than one complete revolution so as to insure engagement of the finger 318 with the tab 50 and rotation of the workpiece 42 to the desired predetermined position.

The apparatus 30 is provided with a welding unit 328 at the work station 62, which welding unit is shown in FIGS. 20 and 21 and it is adapted to be shifted into and out of engagement with the work at high speeds and to accomplish the welding operation efficiently and effectively. The welding unit 328 comprises an electrode 330 positioned for axial alignment with an electrode fixture 34 on the turret at the welding station 62. As shown in FIGS. 20 and 21 the electrode 330 is recessed as at 332 for providing clearance for the fixture fingers 160 and 162, and an end portion of the electrode 330 is adapted to engage the workpiece 42 in alignment with the lead wire or workpiece 40 for accomplishing an effective resistance weld between the head portion of the lead wire and the workpiece 42.

The electrode 330 is operatively connected with an insulated bushing 332 which in turn is secured to and carried by a lower end of a reciprocable tubular guide member 334. In the embodiment shown, the electrode 330 is connected to the bushing 332 through an electrical contact member 336 having a depending portion 338. The portion 338 extends into a bath 340 of mercury or the like contained in a reservoir 342 having a terminal 344 adapted to be connected by a suitable wire with the power and control unit 76 of the welding system. This arrangement enables the electrode 330 to be moved into and out of engagement with the workpiece at high speeds without interference from or restriction by the necessary electrical connections.

The tubular slide member 334 extends upwardly through a ball type anti-friction bushing 346 which is supported in a fixed block 348 mounted on a bracket 350. An upper end of the guide 334 is connected with a fitting 352 joined with a closed end of a flexible bellows 354. The bellows is enclosed by a housing 356 having a lower margin 358 sealed to a lower margin of the bellows and fixed with respect to the block 348. Thus a sealed pressure chamber is provided between the bellows and the housing 356.

The housing 356 has an inlet port 360 at its upper end communicating with a pipe fitting 362 having a lateral opening connected by conduit means 364 through a valve structure 366 with a source of air under pressure, not shown. An upper end of the fitting 362 is connected with a two-stage pressure switch 368.

When the valve 366 is shifted to a first position the port 360 at the upper end of the housing 356 is connected with the source of air under pressure. As pressure builds up within the pressure chamber, the flexible bellows 354 is axially collapsed whereby the guide member 334 and electrode 330 are moved downwardly for engaging electrode against the workpiece. When the valve unit 366 is shifted to a second position, the pressure line is vented to the atmosphere for relieving the pressure within the housing 356 whereby the bellows may expand for raising the guide member 334 and the electrode 330. A compression spring 370 is disposed between the fitting 352 and the bushing 346 for aiding in returning the guide member 334 to its raised or retracted position.

The two-stage pressure switch 368 may be of known construction and therefore need not be described in detail. It is sufficient to state that the switch is constructed and connected in the welding control circuit and the turret indexing control circuit in a manner such that when the electrode 330 is urged against the workpiece and a first predetermined pressure is built up within the chamber the welding circuit will be energized for accomplishing welding of the part and when a second higher pressure is built up within the pressure chamber the solenoid-operated valve 366 is actuated for venting the pressure to the atmosphere and permitting the spring 370 and the bellows 358 to retract the electrode.

The apparatus is provided with a mechanism 380 at the station 64 for unloading finished work assemblies from the fixtures 34 and discharging the workpieces into a chute 382 shown generally in FIG. 1 which then directs the assemblies to a storage bin 384. The unloading mechanism 380 is shown in FIGS. 22 and 23 and includes a workpiece pickup head 386 fixed to a vertically reciprocable slide 388. The slide is connected with a piston rod 390 which is actuated by a double-acting air cylinder 392 between vertically retracted and extended positions.

As shown in FIG. 23, the reduced diameter upper end portion 158 of the fixture 34 has an axial length greater than that of the workpiece 42 so that the lower margin of the workpiece is spaced vertically above the end of the main body 154 of the fixture. The pickup head 386 includes finger portions 394 and 396 which are adapted to project beneath the lower margin of a workpiece when the workpiece is advanced to the unloading station and the head 386 is positioned at its lowered workpiece pickup position. The fingers 394 and 396 define a slot therebetween which is aligned with the path of travel of the fixture 34 and the workpieces thereon so that the fixtures may move freely between the fingers 394 and 396 when the head 386 is in its lower pickup position which is shown in FIGS. 22 and 23.

After a workpiece has been advanced to the unloading station and positioned over the fingers 394 and 396, the cylinder 392 is actuated for raising the slide 388 whereby to lift the workpiece from the fixture 34. The pickup head 386 is raised to the broken line position shown in FIG. 22, in which position a workpiece carried thereby is in general alignment with a laterally opening aperture 398 of an air jet tube 400 which extends from an air valve 402. The valve is connectable with a suitable source of air under pressure by a conduit 404. The arrangement is such that when the pickup head has been raised to the broken line position, the valve 402 is actuated so that a jet of air will blow the workpiece from the pickup head 386 and onto the discharge chute 382.

In FIG. 28 there is shown a simplified electrical and pneumatic control circuit incorporated in the apparatus. The control circuit comprises a valve 420 connected with the lead wire escapement actuating cylinder 130 and adapted to be actuated by a solenoid 422 which is suitably connected with a relay panel 424 and with a switch 456. Another valve 426 is suitably connected with the cylinder 190 and is associated with an actuating solenoid 428 which is connected with the relay panel. The turret indexing cylinder 171 is controlled by a valve 430 shiftable to one position for connecting the cylinder with a source of fluid under pressure and to another position for venting the cylinder to the atmosphere. A solenoid 432 is connected with the valve 430 for actuating the valve, which solenoid is suitably electrically connected with the relay panel 424. The photo electric eye unit 232 is also connected with the relay panel for functioning in the control circuit in the manner described below.

The cap or body member escapement mechanism actuating the solenoid 246 is controlled by a valve 434 which is actuated by a solenoid 436. The solenoid 436 is electrically connected with and controlled from the relay panel 424. The cap or body member loading cylinder 294 is similarly controlled by a valve 438 which is adapted to be actuated by a solenoid 440 electrically connected with the control or relay panel 424. Another valve 442 is connected with the rack actuating cylinder 326. A solenoid 444 is provided for actuating the valve 442, which solenoid is connected with the relay panel 424.

The above mentioned valve 366 which is associated with the welding unit actuating bellows 354 is connected with and actuated by a solenoid 446. This solenoid is also electrically connected by suitable wires with the control or relay panel 424.

The work assembly unloading or pickup head actuating cylinder 392 is connected with and controlled by a valve 448. Valve 448 is actuated by a solenoid 450 which is electrically connected with the relay panel 424. The previously mentioned valve 402 which controls the workpiece discharging air jet is connected with and controlled by a solenoid 452 which in turn is electrically connected to and controlled by the relay panel 424.

The relay control panel 424 is suitably connected through a master switch 453 to power lines L–1 and L–2. It will be appreciated that the relay panel 424 may include numerous variations in relays, control and safety devices and wiring arrangements and therefore a specific description of the relay panel is unnecessary.

The various valves of the control system are adapted to be connected by suitable pressure conduits with a source of air under pressure, not shown. It is understood that any suitable arrangement of the conduits and suitable couplings, fittings and pressure chambers may be used.

The control circuit also includes a plurality of switches associated with the various air cylinders or parts actuated thereby for combining with the relay panel in providing automatic operation of the apparatus. More specifically, switches 454 and 456 electrically connected with the relay panel and disposed adjacent the cylinder 190 as shown in FIGS. 11 and 28 are provided. These switches are adapted to be actuated by a dog 458 carried by the slide 186. Additional switches 460 and 462 shown in FIG. 28 are disposed adjacent the turret actuating cylinder 171 and more specifically for engagement by an element such as the lever 169. The arrangement is such that the switch 460 will be engaged and closed when the cylinder 171 is actuated for retracting the lever 169 and the switch 462 is engaged and closed when the cylinder is extended for advancing the lever 169 and advancing the turret.

Switches 464 and 466 are connected in the circuit and associated with the cylinder 294 as shown in FIGS. 15 and 28. The switches 464 and 466 are operatively connected with the relay panel and are respectively adapted to be actuated by a dog 467 when the cylinder 294 is operated for raising and lowering the tube 288.

Additional switches 468 and 470 are shown in FIGS. 15 and 28, which additional switches are associated with the rack actuating cylinder 326 and are adapted to be actuated by a dog movable with the rack. Of course these switches are also operatively electrically connected with the relay panel 424.

In addition to the two-stage pressure actuated switch 368 shown in FIGS. 20 and 28 and associated with the welding unit a switch 472 is provided adjacent the reciprocating portions of the welding unit. The switch 472 is adapted to be closed when the welding unit is actuated for raising the electrode 330. Of course, the pressure switch 368 and the switch 472 are operably electrically connected with the relay panel 424 and in addition the first stage of the pressure switch 368 is operably connected with the power and control unit 76 of the welding system as was mentioned hereinabove.

The control system is provided with additional switches 474 and 476 shown in FIGS. 22 and 28. These switches are operatively connected with the relay panel 424 and are disposed adjacent the unloading unit actuating cylinder 392 and are adapted to be engaged and actuated by a dog 478 and carried by the pickup head 386.

When placing the apparatus in operation, the master switch 453 is closed for energizing the control circuit and, the feed hopper units, vibrators, welding power unit and electric eye light are also energized. In addition, the various air cylinders are positioned so that the feeding funnel member 180 at the station 36 is in its lower position, the feeding tube 288 at the station 38 is raised, the electrode of the welding unit at the station 62 is raised, the pickup head at the station 64 is lowered, the rack 322 at the station 38 is retracted, and the turret indexing cylinder and piston 171 are extended.

Furthermore, the fixture 34 at the loading station 36 is empty. It will be noted that when this fixture is empty the beam of light from the bulb 216 passes through the fixture and is seen by the electric eye 234 so that a relay in the unit 232 which is connected with the main relay and control panel 424 is maintained.

In order to initiate operation of the apparatus a workpiece or lead wire 40 is manually dropped down the funnel or chute 180 so that it enters the fixture 34 at the work station 36. When this lead wire enters the aperture 156 in the fixture, the light beam is broken for operating a relay in a manner which energizes the solenoid 428 for shifting the valve 426 so that the cylinder 190 raises the funnel member 180. When the member 180 reaches its upper position, the switch 454 is closed for completing a circuit through the relay panel 424 for energizing the solenoid 432 and shifting the valve 430 in a manner for actuating the indexing cylinder 171. When the cylinder 171 is retracted, the switch 460 associated therewith is closed which energizes a portion of the circuit for operating the solenoid 444 and its associated valve 442 for advancing the rack actuating cylinder 326. When this cylinder is advanced the switch 470 associated therewith is opened. The switch 470 is included in a holding circuit for the indexing valve solenoid 432, which holding circuit is subsequently broken by a master relay circuit energized by the switch 460 so that the indexing valve is closed for extending the cylinder 171 and indexing the turret.

The master relay circuit also causes the rack cylinder to be actuated for retracting the rack and closing the switch 468 while at the same time the indexing cylinder is advancing so that the turret is indexed and the switch 462 is closed. This completes a circuit including normally closed switches 472 associated with the welding unit at the stations 62 and 476 associated with the unloading unit at the unit 64 and certain contacts in the relay and control panel 424 so that the valve associated with the cylinders 190, 294 and the flexible bellows 254 are actuated for lowering the funnel or chute 180, the tube 288 and the welding electrode 330. At the same time a portion of the relay circuit is energized for actuating the valve 448 for operating the discharge or unloading unit cylinder 392 for raising the discharge pickup head 386. When the funnel member 180 moves into position, the switch 456 is closed whereby a holding circuit for the master relay means in the panel 424 is interrupted, but at the same time, the electric eye now sees light through the empty fixture which has been indexed to the loading station so that the previously described holding circuit including the electric eye is energized. When the tube 288 is lowered, the switch 466 is opened while at the same time the rising discharge or pickup head 386 causes the switch 474 to be opened so that a relay associated with these switches is opened for actuating the valves 438 and 448 for causing the tube 288 to be raised and the discharge head 386 to be lowered. However, before the discharge head is lowered, the solenoid 452 associated with the valve 402 is energized for opening the valve and causing a blast of air to blow the assembled workpiece from the discharge head.

When the switch 464 is closed upon raising of the tube 288, a portion of the circuit is completed for energizing the solenoid 436 associated with the valve 434 and the escapement actuating cylinder 246 is operated for ejecting one of the caps or body members 42.

When the electrode 330 of the welding unit 328 is moved on into engagement with the work assembly at the station 62, pressure in the switch 368 progressively builds up. At a first predetermined pressure the welding power and control unit 76 is actuated for accomplishing the welding operation and at a second predetermined higher pressure the contact of the switch 368 shown in FIG. 28 is opened for permitting a relay associated with the valve 366 to open for actuating the valve for raising the welding head. At this point the cycle is ready to be repeated.

While the preferred embodiment of the present invention has been shown and described herein it is obvious that many details may be changed without departing from the spirit and scope of the appended claims.

The invention is claimed as follows:

1. An apparatus for assembling workpieces of the type described comprising fixture means having an aperture therethrough for receiving a first wire-like workpiece and a portion for receiving a second workpiece disposed adjacent the first workpiece, conveying means supporting said fixture means for movement along a path of travel to and past a plurality of stations, means at a first station adjacent said path of travel for directing a first wire-like workpiece to and in alignment with said aperture in a fixture means located at said first station, means for pulling the wire-like workpiece into the aperture, means providing a light directed for shining through said aperture, means including a light sensitive element for actuating said conveying means when the light is interrupted by a workpiece inserted into said aperture, means including a shiftably mounted tubular element at a second station adjacent said path of travel for assembling a second workpiece on said fixture means, means for selectively applying suction to said tubular element for holding the second workpiece and air pressure to the tubular element for positively discharging the workpiece from the tubular element and onto said fixture means, means for turning said second workpiece while on the tubular element for orienting the second workpiece in a predetermined manner, means at a third station adjacent said path of travel for electrically welding the first and second workpieces on the fixture means together, said welding means including an electrode shiftable into and out of engagement with a workpiece at said third station, means including pressure responsive bellows connected with said electrode for shifting the electrode, and means adjacent said conveying means for discharging a finished assembly on said fixture means.

2. An apparatus, as defined in claim 1, wherein said means for discharging the finished assembly from said conveying means includes a pickup head having finger means for projecting beneath said second workpiece of an assembly at said discharge station, means for lifting the pickup head for raising the assembly and withdrawing said wire-like workpiece from the aperture in the fixture means, and means for discharging the assembly from said pickup head.

3. An apparatus for assembling workpieces comprising means for containing a supply of first workpieces having elongated wire-like bodies and enlarged heads having predetermined transverse dimensions, disc means rotatable about a generally horizontal axis adjacent to and above said first means, said disc means including circumferentially arranged magnetic elements for picking up said first workpieces from said first means, track means having portions extending along opposite sides of said magnetic elements and defining a slot therebetween having a width less than said predetermined transverse dimensions for stripping said first workpieces from said magnetic elements and directing the first workpieces to a first station, a fixture means having an aperture therethrough for receiving the elongated wire-like body of a first workpiece, conveying means supporting said fixture means for movement to and from said first station and a plurality of additional stations, means at said first station for directing a first workpiece to and in alignment with said aperture in the fixture means at said first station, means for pulling said first workpiece into said aperture, means for providing a light beam for shining through said aperture in the fixture means at the first station, means including a light sensitive element for actuating said conveying means when the light beam is interrupted by a workpiece inserted into said aperture, means at a second station adjacent said conveying means including a shiftably mounted tube for assembling a second workpiece on said fixture means adjacent said first workpiece, means for selectively applying suction to said tube for holding the second workpiece and air pressure to said tube for positively discharging the second workpiece from the tube and onto said fixture means, means for engaging and positively orienting the second workpiece in a predetermined manner while the second workpiece is on said tube, means at a third station adjacent said conveying means for electrically welding the workpieces on said fixture means together, and means adjacent said conveying means for discharging a finished assembly from said fixture means.

4. An apparatus for assembling a first workpiece having an elongated wire-like body and an enlarged head of predetermined transverse dimensions with a second workpiece, comprising a fixture having an aperture therein for receiving the wire-like body of the first workpiece, means supporting said fixture for movement past a plurality of stations, means at a first station for directing said first workpiece to the fixture with said wire-like body in alignment with said aperture, means at said first station for applying suction to said aperture for pulling the wire-like body of said first workpiece into said aperture, means at a second station for directing the second workpiece onto said fixture at the second station, and means at a third station for engaging and welding said workpieces onto the fixture at said third station.

5. An apparatus for assembling a first workpiece having an elongated wire-like body and an enlarged head of predetermined transverse dimensions with a second workpiece comprising a fixture for receiving and retaining said first and second workpieces, means for supporting said fixture for movement past a plurality of stations, means at a first station for directing said first workpiece onto the fixture at said first station, means including shiftable tube means at a second station for directing said second workpiece onto the fixture at the second station, means at said second station for selectively applying suction to the tube means for holding the second workpiece and air pressure to the tube means for positively depositing the second workpiece from the tube means onto said fixture, and means at a third station for engaging and welding said workpieces on the fixture at the third station.

6. An apparatus, as defined in claim 5, which includes means at said second station for turning said second workpiece and orienting the second workpiece in a predetermined manner.

7. An apparatus for assembling a first workpiece having an elongated wire-like body and an enlarged head of predetermined transverse dimensions with a second workpiece, comprising a fixture for receiving and retaining said first and second workpieces, means supporting said fixture for movement past a plurality of stations, means at a first station for directing one of said workpieces onto the fixture at said first station, means at a second station for directing the other of said workpieces onto the fixture at said second station, a welding unit at a third station for engaging and welding the workpieces on the fixture at said third station, said welding unit including an electrode shiftable for engagement with and disengagement from the workpieces, pressure actuated flexible bellows connected with said electrode for shifting the electrode, pressure switch means connected with the bellows for controlling operation of the welding means, and means electrically connecting said electrode with a source of electrical energy including a container having electricity conducting liquid therein, and a conductor element fixed to and movable with said electrode and relative to said container and including a portion extending into the container and said liquid.

8. An apparatus for assembling a first workpiece having an elongated wire-like body and an enlarged head of predetermined transverse dimensions with a second workpiece, comprising a fixture for receiving and retaining said first and second workpieces, means supporting said fixture for movement about a generally vertical axis past a plurality of stations, means at a first station for directing one of said workpieces onto the fixture at the first station, means of a second station for directing the other said workpieces onto the fixture at the second station, welding means including an electrode at a third station shiftable into engagement with the workpieces on the fixture at said third station for welding the workpieces together, said fixture constituting a second electrode of said welding means, and means for electrically connecting said fixture in a welding circuit including an annular container extending around said axis for containing an electricity conducting liquid, and a conducting element fixed to and movable with said fixture and including a portion extending into said container and said liquid.

9. In an apparatus for processing workpieces having a body portion and an enlargement of predetermined transverse dimensions, a combination comprising rotatable means mounted for rotation about a predetermined axis adjacent a supply of said workpieces, magnetic elements disposed circumferentially around said rotatable means and presenting opposite side surfaces extending radially of said rotatable means and a peripheral edge, said magnetic elements being adapted to pick up said workpieces from said supply said side surfaces, and guide means including portions extending along opposite sides of said magnetic elements beginning at a place spaced radially inwardly from said peripheral edge and other portions extending laterally away from said rotatable means, said guide means defining a slot in alignment with and receiving said peripheral edge and having a width less than said predetermined transverse dimensions and serving to strip the workpieces from said magnetic elements of said rotatable means and thereafter support said workpieces by the enlargements thereof.

10. In an apparatus for processing workpieces having a body portion and an enlargement of predetermined transverse dimensions, the combination comprising disc means supported for rotation about a generally horizontal axis adjacent a supply of said workpieces, said disc means including a substantially continuous radially extending peripheral portion comprising alternately disposed magnetic sections having radially extending side surface portions and non-magnetic sections, said magnetic sections being adapted to pick up the workpieces from said supply at said side surface portions, and a pair of track elements including portions extending in overlapping relationship with said disc means and along opposite sides of said peripheral portion from a place spaced radially inwardly from a peripheral edge of said peripheral portion for stripping workpieces from said magnetic section upon rotation of the disc means, said track element defining a slot therebetween aligned with said peripheral edge and having a width less than said predetermined transverse dimensions for supporting the workpieces by the enlargements thereof.

11. An apparatus, as defined in claim 10, wherein said magnetic sections are circumferentially spaced from each other a distance at least substantially as great as a length of said workpieces so that each workpiece will be magnetically retained substantially by only a single magnetic section.

12. In an apparatus for processing workpieces having an elongated wire-like body portion and an enlargement of predetermined transverse dimensions, the combination comprising a fixture having an aperture therein for receiving said wire-like body portion of a workpiece, a funnel member disposed in axial alignment with said aperture and shiftable toward and away from the fixture for directing a workpiece to said aperture, and means for urging the wire-like body portion of the workpiece into the aperture.

13. An apparatus, as defined in claim 12, wherein said means for urging the wire-like body of the workpiece into the aperture comprises means for applying suction to the aperture.

14. An apparatus, as defined in claim 12, which includes control means comprising means providing a beam of light for shining through said aperture in the fixture, and a light sensitive element responsive to an interruption of the light beam when said wire-like body portion of the workpiece enters the fixture aperture.

15. In an apparatus for processing workpieces, a fixture for receiving and retaining a workpiece, a tubular element mounted for movement toward and away from said fixture, means for applying suction to the tubular element for retaining a workpiece for movement toward the fixture, means for applying pressure to the tubular element for positively discharging the workpiece from the tubular element and onto the fixture, a sleeve surrounding and rotatable relative to said tubular element and including means engageable with a workpiece for rotating the workpiece relative to the tubular element for orienting the workpiece in a predetermined manner, and means for rotating said sleeve.

16. An apparatus for processing workpieces of the type described, comprising a turret mounted for rotation about a predetermined axis, a fixture mounted on said turret and having an aperture therethrough generally parallel to said axis for receiving and retaining a workpiece, means for applying a suction to said fixture aperture for drawing a workpiece into the aperture, said means for applying suction to the fixture comprising a tubular member carried by the turret and having one end communicating with said aperture, a fixed suction port disposed adjacent said turret for alignment with an opposite end of said tubular member when the turret is rotated to a predetermined position, and valve means for closing said port when the turret is rotated to shift said tubular member out of alignment with said port.

17. An apparatus for assembling a first workpiece having an elongated wire-like body and an enlarged head of predetermined transverse dimensions with a second cap-shaped workpiece, comprising a turret mounted for rotation about a generally vertical axis, means including a pneumatic cylinder connected with said turret for intermittently indexing the turret, a plurality of electrode fixtures mounted on said turret for movement around a predetermined path of travel past a plurality of stations, each of said electrode fixtures having an aperture therethrough parallel to said axis for accommodating said wire-like body of a workpiece, means at a first station for directing successive first workpieces to successive fixtures at the first station, said last-mentioned means including a fixed funnel-shaped member disposed above said turret and a second reduced diameter funnel-shaped member telescopically associated with and beneath first mentioned funnel-shaped member and mounted for vertical movement to and from fixtures at the first station, means including a pneumatic cylinder connected with said second funnel member for actuating the second funnel member, means at a second station for depositing successive second workpieces on successive fixtures at the second station, said last named means including a tubular element mounted for substantially vertical reciprocable movement to and from fixtures at the second station, means including a pneumatic cylinder connected with said tubular movement for actuating said tubular element, means for applying suction to the tubular element for retaining a second workpiece and for subsequently applying pressure to the tubular element for positively discharging the second workpiece therefrom and onto a fixture, a sleeve member rotatably disposed around said tubular element and including means for engaging a second workpiece retained by the tubular element, means including a pneumatic cylinder for rotating said sleeve a predetermined amount for rotating a second workpiece retained by the tubular element for orienting the second workpiece in a predetermined manner, means at a third station for engaging and welding workpieces on the fixtures at the third station and including a shiftably disposed electrode and pneumatically operated means for shifting said electrode, a workpiece assembly pickup head shiftably disposed at a fourth station for engaging workpiece assemblies at the fourth station and raising the assemblies from the fixtures, means including a pneumatic cylinder connected with said pickup head for actuating the pickup head, and means for actuating said pneumatic cylinders and said pneumatically operated means in timed relationship.

References Cited by the Examiner

UNITED STATES PATENTS

| | | | |
|---|---|---|---|
| 962,030 | 6/1910 | Kirkegaard | 198—41 X |
| 1,553,728 | 9/1925 | Sjobring et al. | 219—84 |
| 1,807,971 | 6/1931 | Day | 219—86 |
| 1,946,980 | 2/1934 | Loomis | 250—223 X |
| 2,352,179 | 6/1944 | Bolsey | 250—215 X |
| 2,689,295 | 9/1954 | Goldner | 219—89 |
| 2,697,774 | 12/1954 | Adler et al. | 219—78 X |
| 2,731,534 | 1/1956 | Hansen et al. | 219—84 |
| 3,054,170 | 9/1962 | Benichasa et al. | |
| 3,095,499 | 6/1963 | Shurtleff et al. | 219—80 |
| 3,161,753 | 12/1964 | Schmick | 219—79 |
| 3,167,326 | 1/1965 | Heessels | 269—21 X |
| 3,191,781 | 6/1965 | Fischer. | |

FOREIGN PATENTS 968,897  5/1950  France.

RICHARD M. WOOD, *Primary Examiner.*

B. A. STEIN, *Assistant Examiner.*